April 9, 1968     H. E. McNEAL     3,376,907
TREE STUMP REMOVING APPARATUS
Filed June 14, 1966
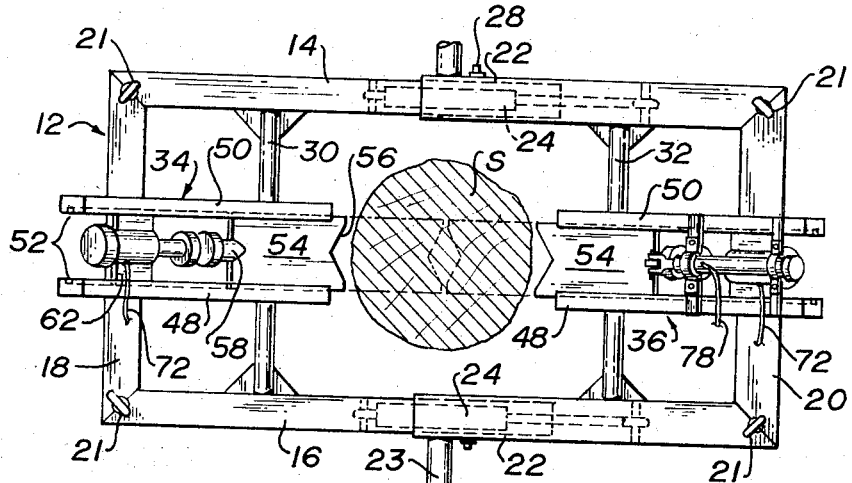
FIG. 1
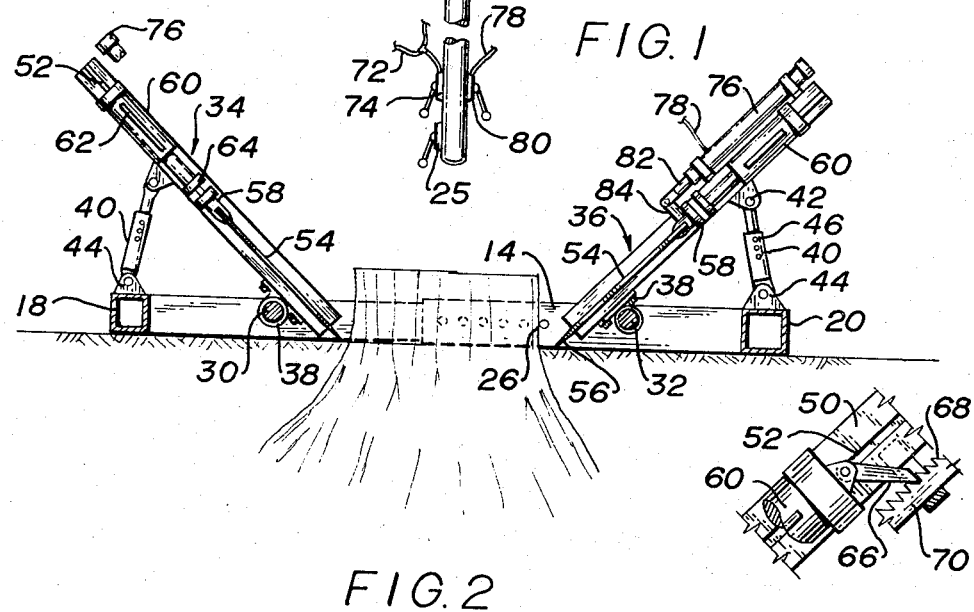
FIG. 2
FIG. 4
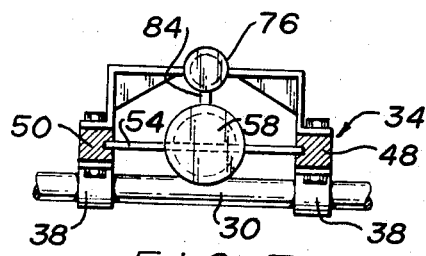
FIG. 3
INVENTOR.
HUGH E. McNEAL
BY
Townsend and Townsend
ATTORNEYS United States Patent Office 3,376,907
Patented Apr. 9, 1968

3,376,907
TREE STUMP REMOVING APPARATUS
Hugh E. McNeal, 9124 Cambon Court,
Spring Valley, Calif. 92077
Filed June 14, 1966, Ser. No. 557,482
10 Claims. (Cl. 144—2)

This invention relates to apparatus for removing stumps that are rooted in an earth surface.

Removal of tree stumps that remain after a tree has been felled is essential, particularly in landscaped areas such as residential property, parks, and the like. Manual labor is frequently employed in effecting removal of stumps and has the disadvantage of substantial expense and slowness. For example, a moderate size stump frequently requires 3–6 man days. Large stumps require a greater amount of time for their removal. Although certain machines for removing stumps have been previously suggested, such machines of which I am aware are so large that they cannot reach areas of restricted access, such as an enclosed residential yard area, without damaging surrounding landscaping.

Therefore, it is an object of this invention to provide apparatus for removing tree stumps, which is relatively uncomplex, but which is efficient and highly portable. The present invention achieves this object by providing a generally rectangular frame, the center of which is open to embrace a tree stump. The frame carries a pair of diametrally opposed subframe assemblies, each of which slidably supports a root severing blade. Also carried on each of the subframes is a power driver, such as a pneumatic hammer, for driving the blades downwardly through the stump roots. The subframe assemblies are angularly adjustable so as to accommodate different size stumps.

Another object is to provide apparatus of the type referred to above which is extremely rapid in its operation. This object is achieved by providing blade power drivers such as pneumatic hammers, which subject the cutting blades to a series of rapidly recurring impulses. Additionally, the paired blades are arranged in diametral opposition to one another so that any tendency for impulses on one blade to lift or otherwise shift the apparatus is compensated for by the other blade. Also contributing to the rapidity with which the present apparatus operates is a powered blade extractor which quickly withdraws the blades after they have made a cut to afford rapid repositioning of the blades for a succeeding cut.

Other objects, features and advantages will be more apparent after referring to the following specification and accompanying drawing, in which:

FIG. 1 is a plan view of the apparatus of the invention shown in embracing relation to a stump to be removed;

FIG. 2 is a side elevation cross-sectional view of the apparatus of FIG. 1;

FIG. 3 is a detail view of a portion of the apparatus taken along line 3—3 of FIG. 2; and FIG. 4 is a detail view of an operative portion of the apparatus.

Referring more particularly to the drawing, reference numeral 12 indicates the main frame of the apparatus which includes, in generally rectangular form, a pair of side members 14 and 16 and a pair of end members 18 and 20. The frame is provided with means for transporting it about, such as corner shackles 21 that provide connections to the frame of a derrick sling, or the like, not shown. Side frame members 14 and 16 are each formed of two portions telescoped at 22 to afford length adjustment of the side frame members to accommodate different sized stumps. The frame has rigid therewith and extending outwardly therefrom, one or more control sticks 23 for enabling manual rotative positioning of the frame.

The frame members are of hollow or tubular construction to reduce the weight of the apparatus and to afford space for pneumatic cylinders 24 which are adapted to adjustably telescope the side frame members 14 and 16. Cylinders 24 are controlled by a control valve 25 mounted on control stick 23. The side frame members adjacent telescope joint 22 are formed with a series of holes 26 for receiving a locking pin 28 for rigidly securing the frame after the telescope joints are adjusted to a desired position.

Spanning side frame members 14 and 16 adjacent opposite ends thereof are cross bars 30 and 32 which, as can be seen most clearly in FIG. 1, are spaced parallel to and inwardly of end frame members 18 and 20 respectively. The cross bars afford additional rigidity to the structure and support for cutter carrying subframes 34 and 36.

Bearing blocks 38 are mounted near the inner lower end of each subframe 34 and 36 to pivotally secure the subframes on respective cross bars 30 and 32. The central portion of each respective subframe is adjustably fixed relative end frame members 18 and 20 by means of telescoping connecters 40, pivotally mounted at their respective upper ends 42 to the subframes and at their lower ends 44 to end frame members 18 and 20. The telescoping connecters are provided with a plurality of spaced transverse holes 46 for receiving a locking pin to fixedly establish the subframes at a desired angular orientation.

Subframes 34 and 36 are substantially identical to one another and include parallelly supported side channels 48 and 50 which define confronting longitudinally extending slots 52. Supported for sliding movement in the slots is a stump severing blade 54 having a concave cutting edge 56 at one end thereof and an impact head 58 at the end opposite the cutting edge. Also slidably carried in slots 52 is a pneumatic hammer 60 which is provided with lateral extensions 62 for engagement with slots 52. Pneumatic hammer 60 has a driving head 64 in alignment with impact head 58 for transmitting force from the hammer to severing blade 54. Mounted on the upper end of pneumatic hammer 60 is a pawl 66 which engages ratchet teeth 68 of an elongate rack 70 mounted parallel to and rigid with subframes 34 and 36. As can be seen in FIG. 4, pawl 66 engages teeth 68 to permit downward movement of hammer 60 and to prevent upward movement thereof. Pneumatic lines 72 extend from the hammers 60 to control valve 74 mounted on control stick 23 to afford actuation of the hammers by an operator. Thus, by operation of valve 74 air hammers 60 are energized to drive blades 54 down through stump S to sever the same, i.e., to the position shown by broken lines in FIG. 1.

For retracting blades 54 preparatory to repositioning the frame around the stump, each subframe 34, 36 has mounted thereon a pneumatic cylinder 76 that has an air line 78 extending therefrom to a control valve 80 mounted on control stick 23. Pneumatic cylinder 76 includes a piston rod 82 joined by a link 84 to blade 54 at the end thereof adjacent impact head 58. It will thus be seen that when valve 80 is operated, pneumatic cylinder 76 acts to slide the severing blades upwardly along frames 34 and 36, thereby withdrawing the blades from the stump. Obviously, during such operation pawl 66 is pivoted out of engagement with ratchet teeth 68, thus permitting both the blade and the pneumatic hammer to be raised.

Operation of the present invention in severing and removing a stump S is as follows: Valve 25 is operated to energize cylinders 24, thereby adjustably telescoping side frame members 14 and 16 in accordance with the size of the particular stump to be removed. When the desired adjustment is attained, cross pins 28 are inserted into appropriately aligned holes 26 in telescoping joints 22 to lock side frame members 14 and 16 into position. Frame 12 is then positioned around the stump as shown in FIG. 1 by lowering the same with a suitable derrick or the like engaged to corner shackles 21. Telescoping connectors 40 are then adjusted to angularly position subframes 34 and 36 for the desired angle of cut. Cross pins through transverse holes 46 in the telescoping connecters fix the angular adjustment. During positioning of frame 12 over the stump, one or more operators attending to control stick 23 and applying manual force thereto can assist in the accurate positioning and centering of the apparatus relative the stump.

With the apparatus positioned as described above, valve 74 is operated to apply pneumatic pressure to air hammers 60 whereupon a rapidly recurring series of impacts is applied by the hammer onto impact heads 58 of severing blades 54. The blades are driven downwardly through the stump toward the center thereof and sever the stump because of the sharpened edges 56 on the blades. When the blades 54 have substantially met at the center of the stump, respective pawls 66 are pivoted upwardly, i.e., out of engagement with teeth 68 on rack 70, and control valve 80 is operated to energize pneumatic cylinders 76, thereby withdrawing the blades from the stump. Frame 12 is then lifted slightly, and by engagement of control stick 23, an operator can readily rotate the frame for another cut on the stump. The foregoing operations are repeated until the stump is entirely severed from the roots. On the last cut by blades 54, the blades are retained in a downward position, so that on upward movement of frame 12, the severed stump is carried upwardly with the apparatus.

It will be seen from the foregoing that the number of cuts necessary to completely sever the stump depends on the relative size of blades 54 and stump S. In an apparatus proportioned relative to stump S as shown in FIG. 1, four cuts are necessary in completely severing the stump.

The individual elements of the specific apparatus described above are to be considered only exemplary. For example, pneumatic hammers 60 function to impart rapidly recurring impulses to drive the blades downwardly through a stump. Other impact producing devices will occur to those skilled in the art. Pneumatic cylinder 76 functions to withdraw blades 54 from the stump after a cut has been made; mechanisms other than pneumatic cylinders for accomplishing this function will occur to those skilled in the art. Pneumatic cylinders 24 are exemplary of any suitable expedient for telescopically adjusting side frame members 14 and 16, and telescoping connecters 40 are exemplary of any suitable devices for angularly adjusting subframes 34 and 36.

It will thus be appreciated that although one embodiment of my invention has been shown and described other adaptations and modifications will be obvious to those skilled in the art without departing from the true spirit and scope of the invention.

What is claimed is:

1. A tree stump cutter comprising a main frame defining a central opening for receiving the stump therethrough, first and second subframes supported on said main frame in diametral opposition adjacent said opening, first and second stump severing blades slidably supported on respective said subframes for movement therealong, means for adjusting the angle of said subframes so that said blades are convergingly directed downwardly and inwardly of the stump below the ground surface, and means for driving said blades along said subframes into said stump.

2. Apparatus for removing a stump that is rooted below an earth surface comprising a main frame including a pair of parallelly opposed telescopically joined members and a pair of rigid bars spanning said members adjacent opposite ends thereof, means for telescopically adjusting said members to adjustably position said bars in parallel spaced relation to one another on diametrically opposite sides of a tree stump, a subframe mounted on each said bar for pivotal movement about mutually parallel axes that are generally parallel to the earth surface, a stump severing blade slidably mounted on each said subframe, and means for driving each said blade downwardly along the associated subframe to sever the root.

3. The invention of claim 2 wherein said blade driving means comprises an impact head rigid with said blade and means supported on each said subframe for applying a series of rapidly recurring impulses to said impact head.

4. The invention of claim 3 wherein said impulse applying means comprises a pneumatic hammer, said hammer having a pawl pivotally mounted thereon, said subframe having a plurality of ratchet teeth for cooperating with said pawl to permit said pneumatic hammer to move downwardly along said subframe and to prevent said hammer from moving upwardly along said subframe.

5. The invention of claim 2 in combination with means secured to said severing blade and to said subframe for controllably moving said blade upwardly along said subframe to withdraw said blade from engagement with a stump.

6. The invention of claim 2 in combination with means for transporting said frame into circumscribing relation of a stump.

7. The invention of claim 2 in combination with at least one elongate control stick rigid with said frame and extending outwardly therefrom for controllably positioning said frame relative a stump.

8. The invention of claim 7 in combination with remote control means mounted on the end of said control stick remote from said frame for controlling said telescopic adjusting means and said blade driving means.

9. The invention of claim 2 wherein said subframe comprises first and second side channels each of which defines a slot longitudinally thereof, means for joining said side channels to one another so that said slots confront one another, said blade being slidably engaged in the confronting slots, and means for pivotally mounting each said side channel to said bars.

10. The invention of claim 9 in combination with means for pivotally adjusting said subframe about said bars to angularly position said subframe relative said main frame, said adjusting means comprising a telescoping connecter having opposite ends attached to said main frame and said subframe, said connecter including a plurality of spaced transverse holes and a locking pin receivable in said holes to lock said telescoping connecter at a preselected extended position.

References Cited

UNITED STATES PATENTS

| 767,048 | 8/1904 | Foshee | 144—34 XR |
| 2,613,458 | 10/1952 | Harrell | 37—2 |
| 2,741,041 | 4/1956 | Wilson | 37—2 |
| 2,835,992 | 5/1958 | Flemer | 37—2 |
| 2,940,487 | 6/1960 | O'Neil et al. | 144—2 |
| 2,887,134 | 5/1959 | Bartlett | 144—2 |

WILLIAM W. DYER, Jr., *Primary Examiner.*

W. D. BRAY, *Assistant Examiner.*